United States Patent [19]
Bachmann et al.

[11] Patent Number: 5,918,632
[45] Date of Patent: Jul. 6, 1999

[54] SINGLE-LOUVER DAMPER WITH DOUBLE SEAL

[75] Inventors: Lothar Bachmann, Auburn; Frank W. Jurgilas, Brunswick; Daniel Kates, Lisbon Falls, all of Me.

[73] Assignee: Bachmann Industries, Auburn, Me.

[21] Appl. No.: 08/936,890

[22] Filed: Sep. 25, 1997

[51] Int. Cl.$^6$ .................................................. F16K 1/226
[52] U.S. Cl. ........................................... 137/601; 251/306
[58] Field of Search .............................. 137/601; 251/306

[56] References Cited

U.S. PATENT DOCUMENTS

| | | | |
|---|---|---|---|
| Re. 31,471 | 12/1983 | Hagar | 137/601 |
| 3,084,715 | 4/1963 | Scharres | 137/601 |
| 3,525,328 | 8/1970 | Crudden | 137/601 X |
| 3,696,804 | 10/1972 | Paredes | 137/601 X |
| 3,749,115 | 7/1973 | Raftis | 137/601 X |
| 3,832,940 | 9/1974 | Hess | 137/601 X |
| 4,077,432 | 3/1978 | Herr | 137/601 |
| 4,256,143 | 3/1981 | Magill et al. | 137/601 |
| 4,493,342 | 1/1985 | Bachmann | 137/601 X |

*Primary Examiner*—Stephen M. Hepperle
*Attorney, Agent, or Firm*—Pierce Atwood; Chris A. Caseiro

[57] ABSTRACT

A louver damper device for the control of fluid flow within a conduit. The louver damper device includes one or more louvers, wherein each louver is a single-walled pivotable unit. The ends of louvers that are adjacent to one another are designed with coupling legs so that when the device is actuated into a blocking position within the conduit, the louver ends become sealingly engaged so as to form relatively small sealing chambers therebetween. Purge air may then be delivered to the sealing chambers to ensure a complete blocking of fluid movement within the conduit. The louvers adjacent to the conduit walls include end modifications similar to those provided to the intermediate louvers. Alternatively, flexible sealing hubs may be affixed to the conduit walls for engagement with modified ends of those perimeter louvers designed to sweep away any particulate residing on the flexible hubs without affect on the seal between those louvers and the interior conduit walls.

13 Claims, 7 Drawing Sheets

SINGLE-LOUVER DAMPER WITH DOUBLE SEAL

BACKGROUND OF THE INVENTION

1. Field of the Invention

The present invention relates to devices used for controlling the movement of fluids through ducts, conduits, and the like. More particularly, the present invention relates to dampers designed to halt or otherwise divert the flow of fluids, specifically gases, substantially completely. Still more particularly, the present invention relates to louver dampers.

2. Description of the Prior Art

In the field of the control of fluid flow it is important that those mechanical components used to effect the halt of fluid flow do so on demand. In industrial applications where fluids such as by-product and reaction gases move through conduits having dimensions of several feet, the mechanical devices used to affect fluid movement are necessarily sized to such conduits and are therefore quite large. These mechanical devices are generally identified by the term dampers. Some dampers are designed to simply divert fluid flow from one conduit to another, others are designed to block fluid flow completely, while most perform both functions. Under either duty, and with increasing interest in minimizing the amount of untreated or "raw" fluids being exhausted directly to the atmosphere, it is important that the fluid being controlled be substantially prevented from leaking through or around the damper. That is, the damper must provide a 100% gas-tight seal when activated. It is also important to effect such complete isolation so that maintenance personnel may enter the conduit for on-line maintenance downstream of the damper, such as required in the maintenance of scrubbers, precipitators, large fans, and the like. In addition, it is preferable that the sealing or blocking of the conduit be effected as soon as possible.

There are a variety of industrial dampers in use in the field of fluid flow control. There are butterfly dampers, which have one or more flaps that may be actuated to seal or open a port or ports to halt or divert fluids. There are poppet valves that are designed to close off a conduit when seated, and to permit fluid flow in a substantially 90° change of direction. There are guillotine dampers, which act much as a guillotine to cut off fluid flow when actuated to enter the conduit. Finally, there are louver dampers, which act much like Venetian blinds. That is, they are formed of a series of blades that are pivoted about a center axis to be swung into a position parallel to the direction of fluid flow to permit fluid flow through a conduit, and pivoted into a position perpendicular to the direction of fluid flow to halt the flow of fluid through a conduit. More specifically, louver dampers are modulating devices in that they are actuated for balancing of flows, as well as for periodic on-off operation. They also tend to be more compact, and therefore take up less space, at least in comparison to guillotine dampers for example. Each of the noted damper designs has its place, as a function of the size of the conduit, the fluid to be controlled, and the operating conditions, including, but not limited to fluid temperature and flow rates. In most cases, it is important that each of these dampers provides means for ensuring that there is little or no fluid leakage when they are activated to prevent fluid flow in a particular conduit.

As indicated, it is important to use a damper that performs its fluid modulation function and that isolates zones of conduits for maintenance access downstream of the damper. This may be achieved with sophisticated damper systems which are costly and require an extensive amount of space within which to operate, as is the case with guillotine and double-louver dampers. It is to be noted that louver dampers are commonly used in the area of fluid flow through conduits where the goal is to modulate, or stop completely, the fluid flow in the conduit. Initial louver dampers were only used to modulate; later, double-louver dampers were designed to both modulate and isolate.

In some prior uses of louver dampers it has been the practice to ensure that there will be little to no fluid leakage by placing pairs of dampers—or double-louver dampers—throughout the conduit, each of the pair spaced apart from the other of the pair so as to form a gap therebetween. Into this gap a pressurizing purge fluid—usually air that is often pre-heated—is injected. The purging air ensures that no fluid will get from the upstream side of the pair of dampers to the downstream side. Pre-heating of this purge or sealing air prevents condensation of gases and consequent corrosion of the damper's components. Unfortunately, this method involves the use of a sizable amount of purge air and is therefore very costly. It further requires the use of twice as much material to form a pair of louvers rather than a single louver. In addition, while it is possible to use a single actuator to move the paired louvers, there are occasions where each louver damper of the pair has its own actuator. Of course, this too is costly.

More recently, a louver that has been used increasingly in commercial settings has moved the pair of damper blade sets much closer to each other so that a single actuation means is required. U.S. Pat. No. Re. 31,471 to Hagar describes such a louver damper. The Hagar louver damper operates as indicated for louver dampers in general; however, it is formed of a plurality of pairs of blade walls, where each pair of walls is mechanically coupled. The Hagar device is operated such that when the plurality of blades are rotated to block fluid flow, they line up to create a single gap between all of the blade walls. In order to ensure a complete seal so that no fluid will pass through the conduit, the gap is purged with pressurizing air that blocks any leak passageways that may exist. Through this design, a single actuation system is required. The Hagar system is therefore more cost-effective than the previous louver dampers. However, the Hagar design is sensitive to temperature differentials between the upstream and downstream sides of the damper in that thermal expansion of the "hot" side of the damper with respect to the "cold" side causes bowing of the entire damper. This causes bimetallic deflection that can result in a less-than-100% gas-tight seal and mechanical jamming of the components, and is therefore a significant limitation on the applicability of the Hagar double-walled damper where there are temperature variations; particularly so in high-temperature conditions.

U.S. Pat. No. 4,493,342 issued to Bachmann, one of the inventors of the present invention, provides for a more-aerodynamic design of the two blade walls, but it is a double-walled design. It is distinct from the Hagar design in that the two blades or walls are isolated from one another. As a result, bi-metallic deflection is not as significant a concern. Nevertheless, like other double-walled dampers, is more costly than is necessary for the task. These dampers require a considerable amount of material for construction of the double-walled blades of the scale required in many commercial applications. The amount of energy required to actuate such large physical devices in the face of considerable fluid pressures is also substantial. Maintenance of the various components used to form the double-walled louvers is also a concern.

An additional problem in modulating or isolating the flow of a fluid through a conduit has not been satisfactorily addressed in the prior louver designs. It is well known that there are fluids containing solids, sticky substances, and the like, that foul the interior of the conduit. These contaminants tend to build up where the louver interfaces with the interior walls of the conduit. This can prevent the louver from closing completely when required. In order to minimize the effects of this particulate or residue build-up on the operation of the louver, it would be preferable to have a louver designed with a self-cleaning capability.

Therefore, what is needed is a louver damper that is fabricated in a way that minimizes its cost and that is space efficient without compromising its performance in modulating and/or isolating fluids in a conduit. What is also needed is a louver damper that can be operated with a single actuation means. Further, what is needed is a louver damper of sufficiently simple design so as to make operation and maintenance costs minimal. Still further, what is needed is a louver damper designed to ensure no fluid leakage occurs when the louver damper is closed. Additionally, such a louver damper should be designed to minimize effects of thermal stresses. In summary, what is needed is an effective and efficient fluid-flow modulation and/or isolation device that preferably includes self-cleaning capability, particularly when the fluid is contaminated with solids.

SUMMARY OF THE INVENTION

It is an object of the present invention to provide a louver damper that is of minimized cost to fabricate. It is an object of the present invention to provide a louver damper that is space efficient and that modulates and/or isolates fluids flowing through a conduit. It is also an object of the present invention to provide a louver damper that can be operated with a single actuation means. It is further an object of the present invention to provide a louver damper of sufficiently simple design so as to make operation and maintenance costs minimal. Still further, it is an object of the present invention to provide a louver damper that is designed to ensure that no fluid is in the zone of the conduit downstream of the damper when it is in a blocking position. It is also an object of the present invention to provide a damper having one or more louvers fabricated so as to minimize the effects of thermal stresses. Therefore, it is an object of the present invention to provide an effective and efficient fluid-flow modulation and/or isolation device that preferably includes self-cleaning capability, particularly when the fluid is contaminated with solids, including, but not limited to, sticky solids of the type that commonly form accretions.

These and other objects of the present invention are achieved by means of a damper formed of one or more single-blade louvers. The louver or louvers are designed to create, when the damper is activated, relatively small chambers for the introduction of sealing air. The number of single-blade louvers used to form the damper of the present invention may be varied as a function of the size of the ducting or conduit to be controlled. The louvers are single-walled rather than the prior-art double-walled louver dampers and are therefore substantially less costly, in totality, than the prior louvers performing the same modulation and/or isolation functions. The use of a single-walled blade also aids in minimizing distortions caused by thermal differentials from the hot side to the cold side of the damper. Each of the single-walled blades may be formed as a simple solid piece of metal. They include a relatively small sealing isolation chamber for the introduction of sealing air throughout the interface regions of the damper unit.

Each louver or flap of the damper includes at its perimeter where it interfaces with an adjacent flap, or with the interior walls of the conduit, modified channel-shaped regions. These modified regions effectively create a double-walled arrangement in that localized area. The interior wall of the conduit must be similarly modified where it is adjacent to the louver damper of the present invention when the damper is in a position to block the flow of fluid within the conduit. When the damper is actuated and the flaps swing into a position perpendicular to the fluid flow, the modified regions of the flaps come into contact with one another so as to create sealing chambers between adjacent flaps. Similarly, the sides, as well as what would effectively be the uppermost and lowermost flaps, include modified regions for the interface between those areas and the interior of the conduit. The modified ends and sides of the louvers are designed not only to create sealing chambers, but also to account for possible variations in fabrication dimensions and to account for any thermal expansion or contraction.

The materials used to fabricate the flaps and their ends are dependent upon the particular application. Parameters such as the corrosiveness of the fluid, temperature, flow rates, and the like, must be considered. The actuation means used to effect movement of the louvers may be any used in the prior art, including, but not limited to, that which is described in the Bachmann patent.

The resultant isolation chambers formed when the modified regions of the flaps come in contact with one another, or with the modified interior wall of the conduit, require far less purge air, in totality, to ensure a complete pressurized seal than the paired louvers or the double-walled louvers of the past. In addition, the total amount of material used to make the flaps and the effective small double-walled isolation chambers is substantially less than that required to make either paired louvers or double-walled louvers. The fact that the present invention is fabricated with fewer components and with self-cleaning seats to be described herein generally reduces costs.

For a damper of the present invention, the regions of the louvers that are closest to the interior walls of the conduit when the damper is actuated into the blocking position, may be of the same design as the modified ends of the louvers that come into contact with one another when the damper is in its blocking, or closed, position. This is particularly true when the fluid moving through the conduit is "clean." Alternatively, and of particular use with fluids having a substantial amount of particulate, the sides of the flaps, as well as the lowermost flap, adjacent to the conduit walls, and the conduit walls at that interface, may be of a different design. Specifically, it is important to note that particulate build-up may occur on the sides and particularly at the bottom of the conduit at the damper location. As a result, over time, it may be difficult to ensure complete contact between that region of the conduit that is modified to retain the damper—generally a type of frame—and the perimeters of the flaps. Failure to ensure complete contact at that interface will result in direct flow-through of raw fluid.

In order to avoid this unacceptable condition, maintenance may be conducted on a frequent basis, or the interface between the conduit wall and the perimeter flaps may be designed to minimize or eliminate particulate buildup at that interface. The present invention achieves this by adding to the frame of the conduit used to retain the damper a sealing means in the shape of a flexible hub. As the modified perimeters of the louvers swing into place, they come into contact with the hub, which flexes so as to bend toward the conduit frame. As the damper continues to move toward its final position, the modified perimeters sweep along the flexible hub. In doing so, they sweep any particulate out of the way in a manner that ensures the modified ends and the hub seal will always remain in contact. The hub is preferably made of a noble alloy, such as stainless steel or a high-grade nickel alloy, so that little particulate will adhere to it.

The design of the present invention is a simplified and cost-effective single-louver damper that ensures complete and effective sealing of a conduit with minimal thermal-distortion problems. Although the single-louver damper of the present invention has been briefly described with respect to specific flap modifications, its adaptability will become more apparent upon review of the following detailed description, the drawings, and the appended claims.

DETAILED DESCRIPTION OF THE PREFERRED EMBODIMENT OF THE INVENTION

Figure 1:
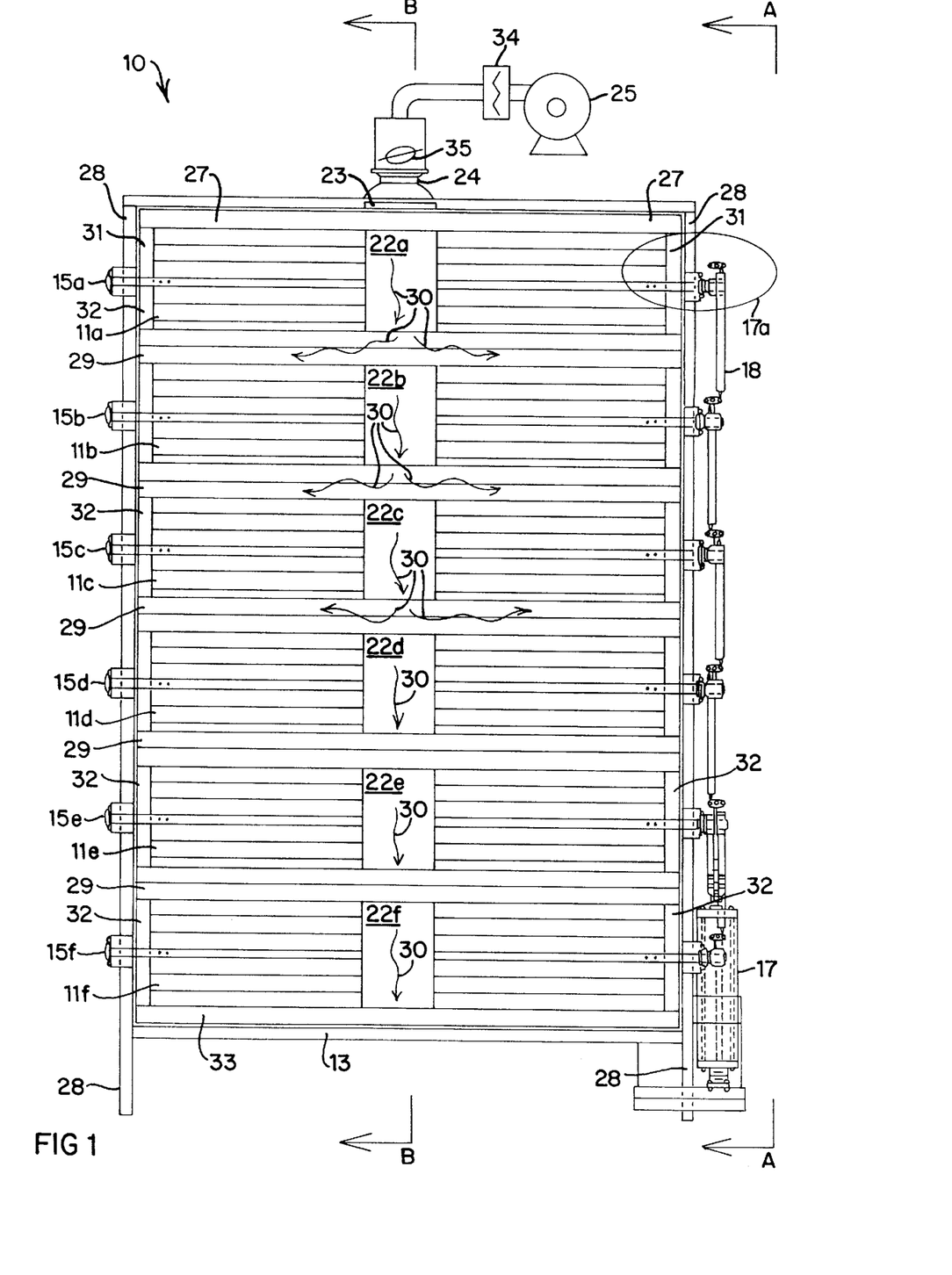
FIG. 1 is an elevation view of the single-blade-louver damper of the present invention, showing the plurality of louvers in a closed position.
Figure 2:
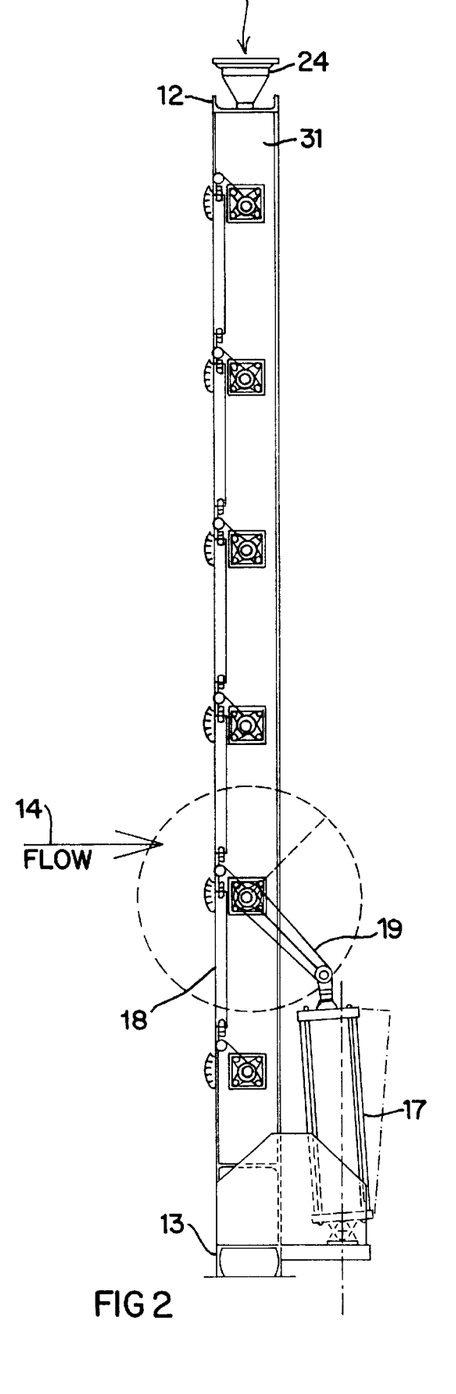
FIG. 2 is a simplified end view of the damper of the present invention as seen from location A—A of FIG. 1, showing the actuation means used to rotate the louvers into and out of the closed position.
Figure 3:
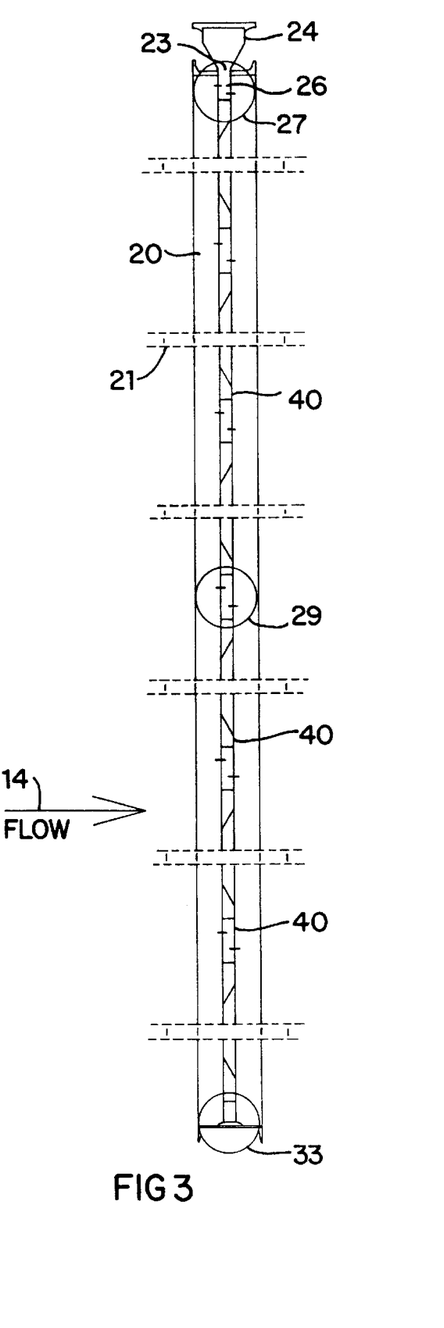
FIG. 3 is a simplified cross-sectional view of the damper of the present invention as seen at section B—B of FIG. 1, showing the cross-sectional design of individual louvers of the damper in the opened and the closed position.

A single-blade-louver damper 10 of the present invention is shown in FIGS. 1–3. The damper 10 includes a plurality of louvers 11. The number and shape of louvers associated with a particular damper is dependent upon the size and shape of the conduit to be blocked, as well as the conditions of the fluid flowing through the conduit and the particular operating conditions. For illustration purposes only, FIG. 1 shows a total of six louvers, identified from top to bottom as louvers 11a, 11b, 11c, 11d, 11e, and 11f. Louvers 11a and 11f are adjacent to an upper conduit frame 12 and a lower conduit frame 13, respectively. The louvers may be fabricated in any manner suited for their intended function; however, it is preferable that they be designed to minimize bending or distortion associated with the temperature gradient that may exist between the upstream "hot" region and the downstream "cold" region of the conduit. For illustration purposes, fluid flow shown at 14 in FIGS. 2 and 3 indicates the upstream hot fluid flow. The detailed louver designs shown in FIGS. 3–5, to be described herein, is the preferred arrangement for minimizing temperature-effect distortion.

Continuing the discussion regarding the design of the louver 10 shown in FIGS. 1–3, the louvers 11 are shown in the closed blocking position. Each louver includes a substantially-centered rotatable shaft 15a–15f for pivoting of the louvers 11a–11f into and out of the blocking position. The shafts must be substantially sealed in a manner well known to those skilled in this field in order to prevent fluid leakage at their interfaces with the conduit walls at 16 shown in detail in FIG. 12. The rotatable shafts 15a–15f may be rotated by any suitable means, including, but not limited to, one or more pneumatic actuators described in the Bachmann patent and shown as actuator 17. In order to provide for simultaneous pivoting of all the louvers 11, a shaft rotating system shown generally at 17a in FIG. 1, preferably includes connecting arms 18 and pivotable rods 19 shown in FIG. 2. The shafts 15 of each louver 11 are all linked together by similar actuation means so that the one actuator 17 may be used to simultaneously pivot all of louvers 11a–11f into a closed position 20, or an open position 21, shown in FIG. 3. Alternatively, multiple actuators may be used, including one for each louver, or one actuator per subset of louvers.

Each of the louvers 11 shown in FIG. 1 preferably includes a small interior louver seal air conduit 22, such that each of the louvers 11a–11f has interior louver seal air conduit 22a–22f, respectively. A seal air access port 23 through upper frame 12 couples a seal air inlet 24 to each of the conduits 22 when the damper 10 is in the closed position 20 as illustrated in FIGS. 1 and 2. That is, when the damper 10 is in the closed position 20, each of conduits 22a–22f is aligned with one another. A purge-air inlet devices, such as fan 25, force purge air 30 through the inlet 24 and the port 23 and into a frame channel 26 of the conduit as well as into louver conduit 22a. It is to be understood, however, that multiple fans may be used to ensure that purge air will always be available, or in the event that the damper 10 is supplied with purge air from a remote site or if it is desirable to place fans at multiple locations around the damper 10.

With continuing reference to FIG. 1, the purge air 30 moves from the frame channel 26 into upper perimeter conduit-louver seal-air chambers 27 and 31 that are formed at the interface between the louvers 11 and conduit frames 12 and 28 in a manner to be described herein. The purge air 30 also moves through louver conduit 22a into intermediate seal-air louver-louver chambers 29 and out toward intermediate perimeter conduit-louver seal-air chambers 32, which are substantially the same as chambers 31, in that they must accommodate the shafts 15 therein. The purge air 30 is also directed into lower conduit-louver seal-air chamber 33. Through this design, the damper 10 of the present invention is completely sealed when the louvers 11 are in the closed position 20 and chambers 22, 27, 29, 31, 32, and 33 are interconnected. It is to be noted that a seal air pre-heater register 34 may be used to pre-heat the purge air 30 so that any possibility of acid dewpoint corrosion caused by condensation on the damper 10 components is reduced. A shut-off valve 35 cuts off the purge air transmission when the damper is in the open position 21. If multiple fans are used, each may have its own register and shut-off valve.

Figure 4:
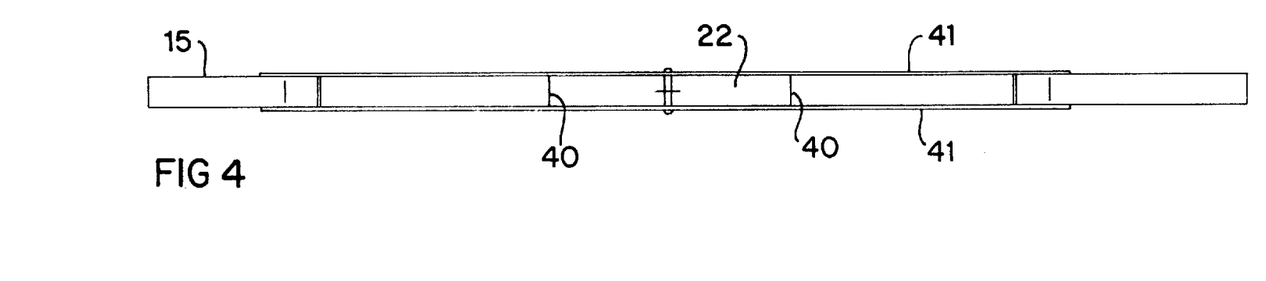
FIG. 4 is a simplified top view of a single-blade louver of the present invention.
Figure 5:
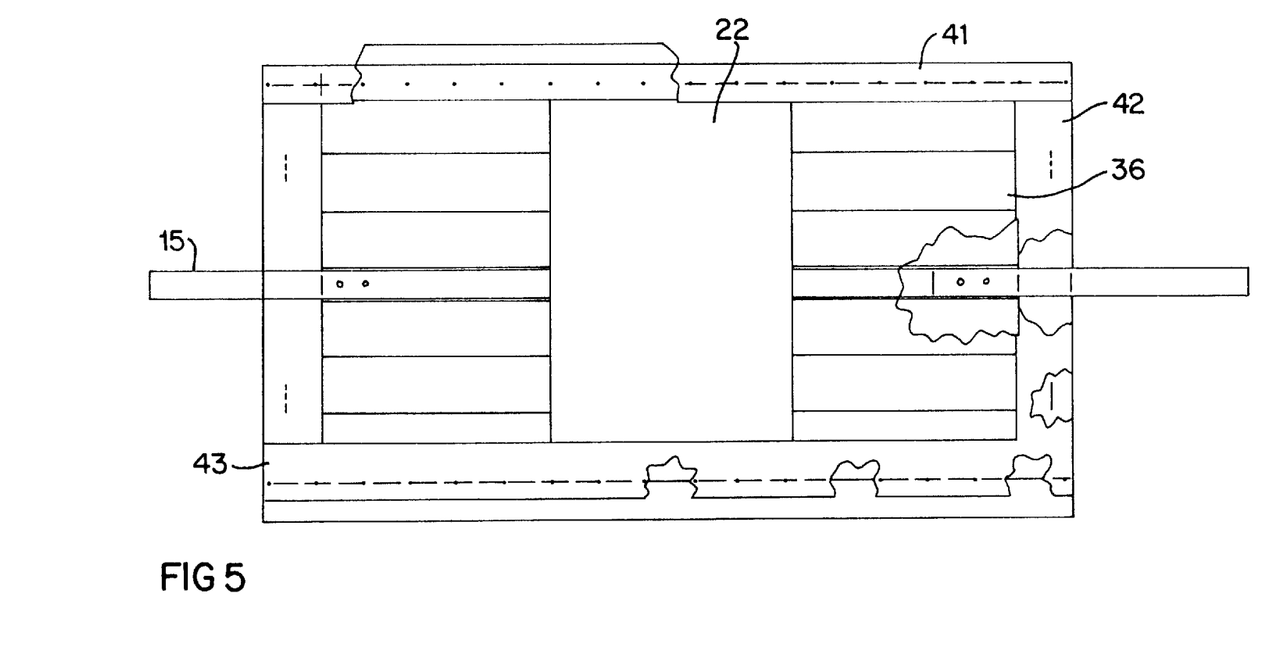
FIG. 5 is an elevation view of a single-blade louver of the present invention, with some cut-away sections illustrating some of the attachment locations for several of the components of the louver.
Figure 6:
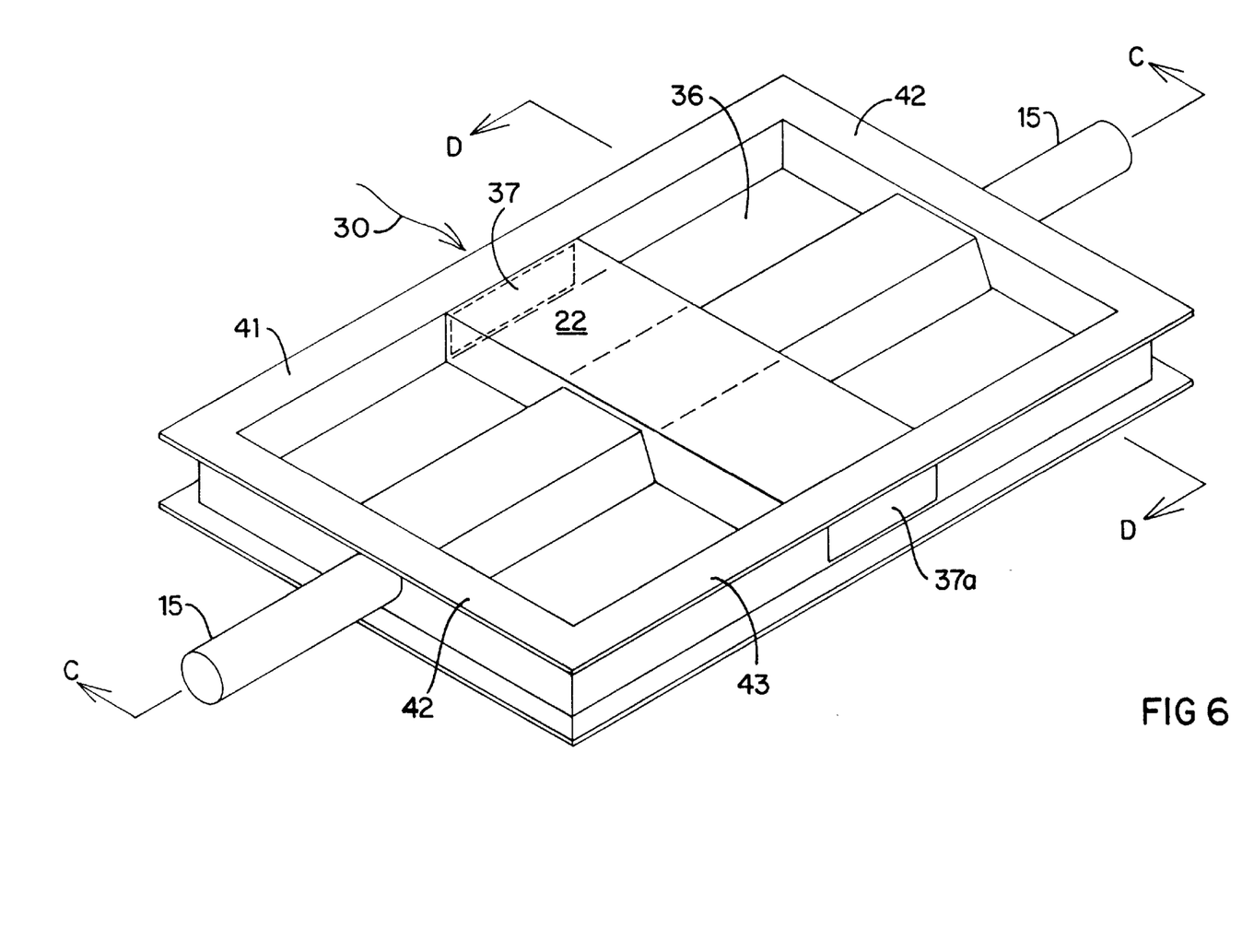
FIG. 6 is a perspective view of a single louver of the damper of the present invention.
Figure 7:
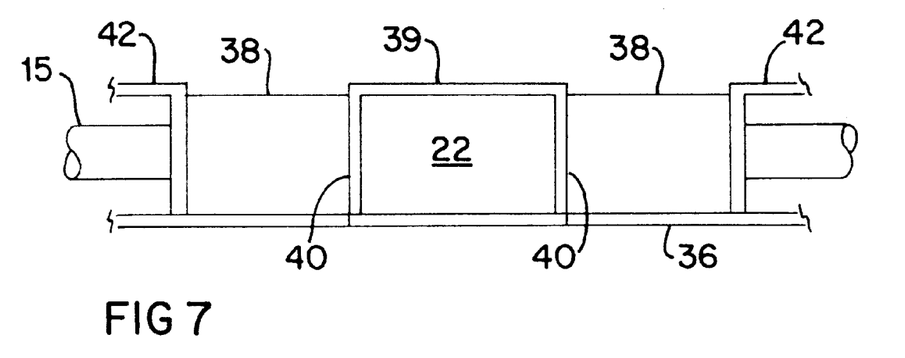
FIG. 7 is a simplified cross-sectional view of the single louver of the damper of the present invention as seen at section C—C of FIG. 6.
Figure 8:
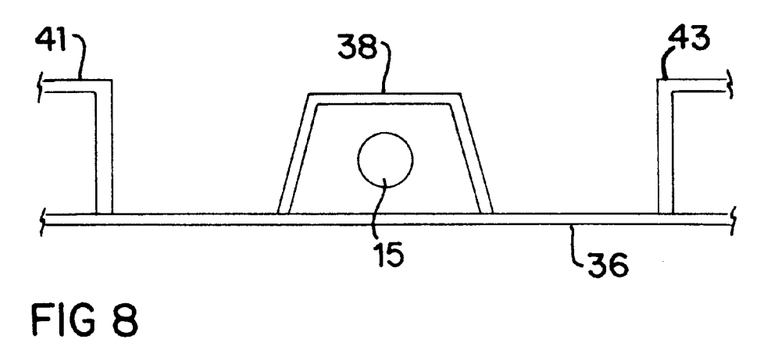
FIG. 8 is a simplified cross-sectional view of the single louver of the damper of the present invention as seen at section D—D of FIG. 6.

FIG. 3 provides a cross-sectional view of each of the louvers 11a–11f, while FIGS. 4–8 provide exemplar illustrations of any one of the louvers 11. As can be seen in FIGS. 5 and 6, the louvers 11 are preferably formed with a blocking wall 36 that is the unitary single wall of the louver damper 10 of the present invention. The louver conduit top 39 and side walls 40 of the louver conduit 22 provide the means by which the purge air 30 is transferred to all louver-louver interfaces and louver-interior-conduit-wall interfaces. The conduit 22 may simply be formed as a bent plate, a box, or other suitable design. The conduit 22 also provides some minor structural support for the wall 36. As can be seen from FIG. 6, the sealing purge air 30 enters the conduit 22 via entryway 37, and exits the conduit 22 via exit 37a. Primary reinforcement of the blocking wall 36 is provided by reinforcement cap 38 that either is coupled to the shaft 15, or that houses the shaft 15 extending across the wall 36. The reinforcement cap 38 may be designed with perforations to allow fluid to pass therethrough in a way that reduces the thermal gradient between the upstream and downstream sides of the wall 36. It is to be noted that the conduit 22 may be omitted and the purge air 30 delivered into the interface regions around the perimeter of the louvers 11 either indirectly by way of the reinforcement cap 38 or by blowing it directly into regions 41–43.

As seen in FIGS. 4 and 5, each of the louvers 11 includes an upper modified region 41, a modified perimeter region 42, and a lower modified region 43. The upper modified region 41 is designed for interfacing with the louver—or the conduit interior at frame 12 for louver 11a—immediately above it. The modified perimeter region 42 is designed for interfacing with the frames 28 of the conduit. The lower modified region is designed for interfacing with the louver—or the conduit interior at frame 13 for louver 11f—immediately below it. The detailed designs of regions 41–43 are to be described herein with reference to FIGS. 9–12. The materials used to fabricate the components of the louvers 11 include, but are not limited to carbon steel, stainless steel, high-nickel alloys, and the like. In addition, for lower-temperature applications, Aluminum and some high-temperature plastics may be employed. It is to be understood that the dimensions and specific shapes of the louvers 11 are dependent upon the particular conduit size and shape and the particular application. It is important, however, in the present invention to provide adequately-sized conduits 22. The designs of regions 41–43 is also important to ensure complete sealing of the conduit when the damper 10 is in its closed position. In the event the damper 10 is to be used in high-temperature conditions, it is preferable to bolt the components together so that they act as independent elements, thereby minimizing bimetallic distortion. The framework used to form regions 41–43 may be made of angled or bent-plate metal of the type described herein.

Figure 9:
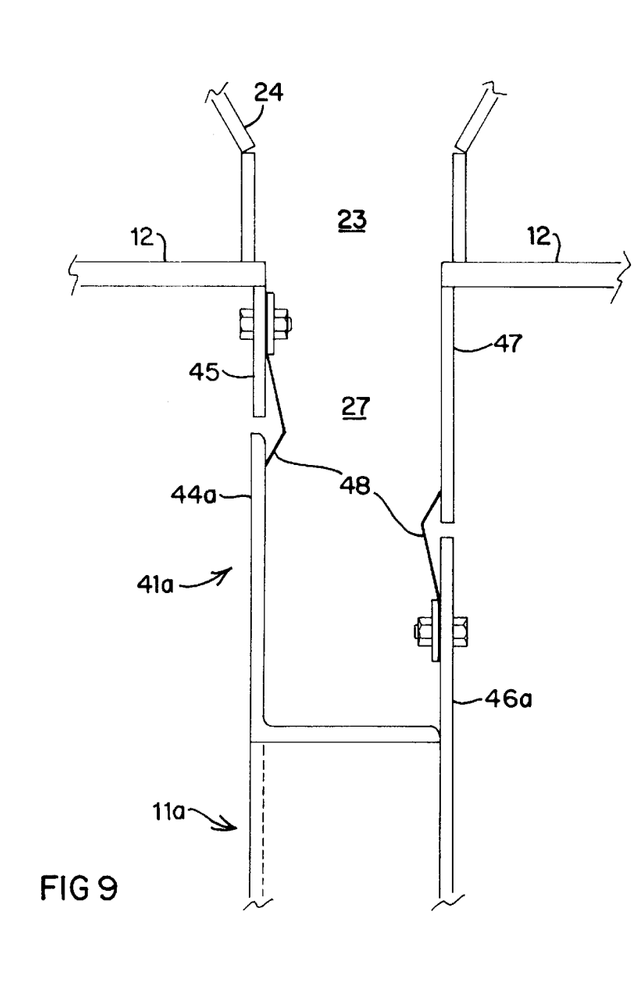
FIG. 9 is a detailed view of the upper-louver-to-conduit-wall interface of the damper of the present invention.

A key feature of the present invention is the design of the louvers 11 at regions 41–43 so as to create chambers 27, 29, 31, 32, and 33. FIG. 9 illustrates the design of upper region 41 of louver 11a so as to create chamber 27. Upper modified region 41a of the louver 11a includes channel ends formed of a longer first upper louver leg 44a that is designed to detachably join with a shorter first conduit channel leg 45 of frame 12 when the damper 10 is closed. Upper modified region 41a also includes a shorter second upper louver leg 46a that is designed to detachably join with a longer second conduit channel leg 47 of frame 12. In order to ensure that an effective seal is maintained between louver 11a and frame 12 of the conduit, legs 44a and 46a include flexible seals 48. The flexible seals 48 are preferably metallic leaf spring seals designed and used to ensure a tight fit at the interface between legs 44a and 45, and legs 46a and 47, respectively. It is particularly important that the flexible seals 48 are positioned so that when chamber 27 is created, the seals 48 are located therein. In that way, when the purge air 30 is used and enters the chamber 27, the spring seals 48 are forced outwardly so as to enhance sealing effectiveness at the interface between legs 44a and 45 and legs 46a and 47. The design of the interface described and shown in FIG. 9 also acts to accommodate any expansion or contraction of the various components, or in variations in fabrication dimensions, as the seals 48 are position-adjustable. They are in sliding engagement with the respective legs of the conduit channel or the flap legs. While seals 48 are shown affixed to legs 44a and 46a of region 41a, the seal 48 affixed to longer leg 44a should be affixed to leg 45.

Figure 10:
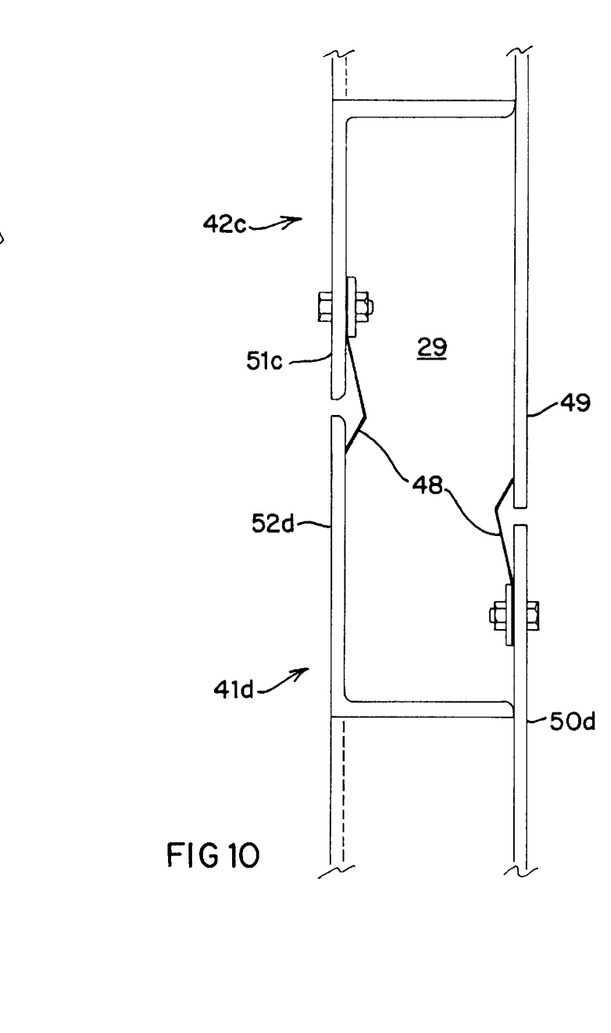
FIG. 10 is a detailed view of a louver-to-louver interface of the damper of the present invention.

FIG. 10 shows the interface between adjacent louvers. For illustration purposes only, the detailed interface presented in FIG. 10 is the one between louvers 11c and 11d used to create chamber 29. However, it is to be understood that the interfaces between louvers 11a–11b, 11b–11c, 11d–11e, and 11e–11f are of similar arrangement. Of course, if the damper 10 is formed of a single louver, there is no interface between adjacent louvers and the only interfaces of concern are those between the damper and the conduit frame.

Continuing the reference to FIG. 10, lower modified region 42c of louver 11c includes channel ends formed of a longer first lower louver leg 49c that is designed to detachably join with a shorter first intermediate channel leg 50d of louver 11d. Lower modified region 42c also includes a shorter second lower louver leg 51c that is designed to detachably join with a longer second intermediate channel leg 52d of louver 11d. In order to ensure that an effective seal is maintained between louver 11c and louver 11d, legs 50d and 51c include flexible seals 48. The flexible seals 48 are designed and arranged in the same manner noted with respect to the discussion of the interface used to create chamber 27. As indicated, all of the louver-to-louver interfaces may be of substantially this same design.

Figure 11:
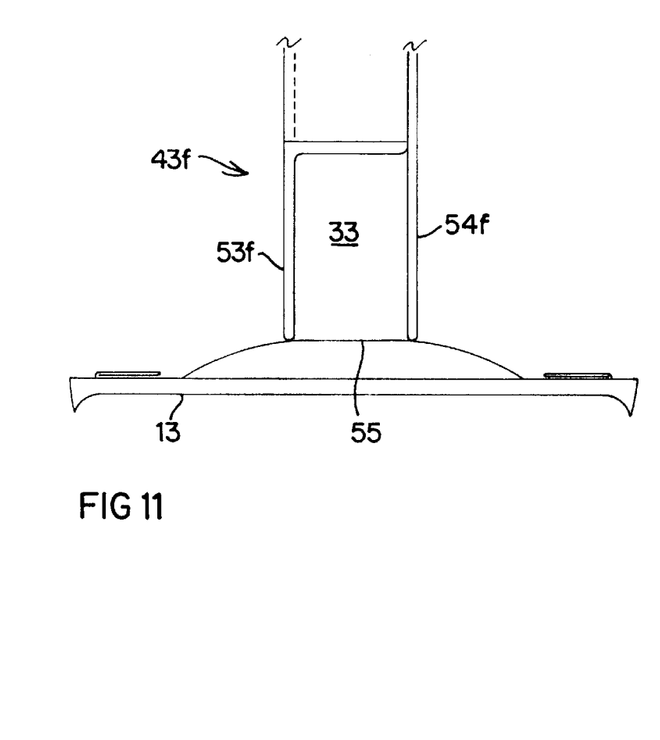
FIG. 11 is a detailed view of the lower-louver-to-conduit-wall interface of the damper of the present invention.

FIG. 11 shows the interface between a bottom louver—louver 11f of FIG. 1—and the bottom region of the conduit—identified generally at frame 13 in FIG. 1. It is at this location, and to a lesser extent at the sidewalls of the conduit, that most particular in the fluid flowing through the conduit accumulates. In that regard, the interface between lower modified region 43f and the lower conduit wall at frame 13 is preferably of a different design. However, it is to be understood that the modified lower region 43f of louver 11f may be of substantially the same design as the upper modified region 41a of louver 11a as described with reference to FIG. 9, particularly when the fluid flowing through the conduit is relatively clean. Nevertheless, that particular interface is described with respect to the design illustrated in FIG. 11.

As can be seen from FIG. 11, sealing chamber 33 is formed when the damper 10 is in the closed position 20 shown in FIG. 3. Specifically, modified region 43f includes channel legs 53f and 54f of substantially equal length. Affixed to the frame 13 is a flexible sealing member 55 in the form of a hub. The sealing member 55 is fabricated of a material and of a thickness that permits it to flex inwardly as legs 53f and 54f pass along its surface when the louvers 11 are actuated. This design ensures that particulate accumulating on the surface of member 55 will be substantially swept away by leg 53f when louver 11f is moved into its blocking position in a manner that ensures a complete sealing of the conduit. The contact between leg 54f and the sealing member 55 ensures that an effective seal is maintained. Purge air 30 may then be introduced into chamber 33 formed between the sealing member 55 and lower modified region 43f of louver 11f. The sealing member 55 is preferably formed of a metallic spring.

Figure 12:
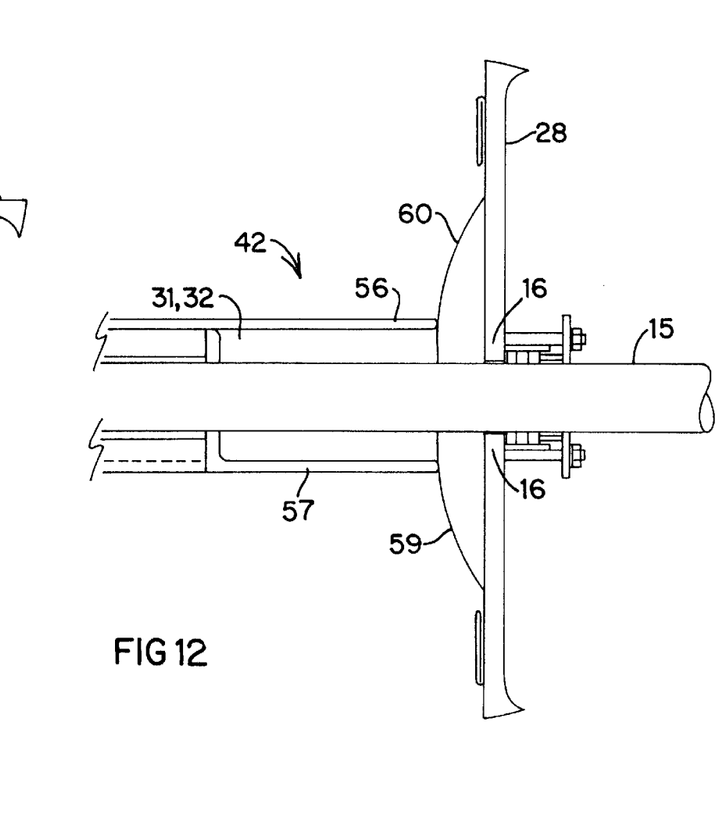
FIG. 12 is a detailed view of a louver-to-conduit-wall interface of the damper of the present invention.

The remaining interface of importance in the present invention is that between the louvers 11 and the side frames 28 of the conduit, through which the shafts 15 of each louver pass. As illustrated in FIG. 12, the interface between the modified perimeter region 42 of any one of the louvers 11 and an interior sidewall of the conduit represented by frame 28 creates sealing chambers 31 and 32, when the damper 10 is in the closed position 20. The modified perimeter region 42 is designed in a manner similar to that of the preferred design of the lower modified region 43f of louver 11f, in that it includes channel legs 56 and 57 of substantially equal length. Affixed to the frame 28 is a pair of flexible perimeter sealing members 59 and 60, each in the form of a hub and positioned in close proximity to the shaft 15. The sealing members 59 and 60 are preferably fabricated in the same manner and of the same material used to form sealing member 55 such that they flex inwardly as legs 56 and 57 pass along their surfaces when the louvers 11 are actuated. This design ensures that any particulate accumulating on the surface of members 59 and 60 will be swept away by when the louvers 11 are moved into their blocking positions. Complete sealing on the sides of the damper 10 is ensured by the sealing of the shafts 15 at location 16.

Although the present invention has been described and illustrated with specific reference to certain detailed designs, it will be apparent to those skilled in this field that alternative embodiments will achieve the same results without deviating from the basic concept of the invention. In particular, as earlier noted, the damper 10 may be formed of a single louver unit that fills the conduit. That single louver may be rectangularly-shaped as shown in the drawings, or it may alternatively be round, oval, or the like. In that regard, the perimeter of the louver would be substantially similar to that which is shown in FIG. 12. All such embodiments and their equivalents are deemed to be within the scope of the invention as set out in the following claims.

We claim:

1. A louver damper device for controlling fluid flow in a conduit having interior walls, the louver damper device comprising:
   a. a plurality of louvers, each of said louvers including:
      i. a single wall flap structure;
      ii. a seal-air conduit section connected to said single wall flap structure;
      iii. a first modified region of said single wall flap structure for interfacing with the interior walls of the conduit and
      iv. a second modified region of said seal-air conduit section for interfacing with adjacent ones of said plurality of louvers;
   b. louver interface means attachable to the interior walls of the conduit; and
   c. actuation means connected to said plurality of louvers for pivoting said plurality of louvers within the conduit, wherein said first modified region of each of said plurality of louvers is designed to engage said louver interface means when said damper device is actuated into a closed position so as to form a plurality of conduit-louver sealing conduits, and wherein pairs of adjacent seal-air conduit sections of said second modified regions of adjacent ones of said plurality of louvers are designed to engage with one another to form in combination a single seal-air conduit when said damper device is actuated into a closed position.

2. The damper device as claimed in claim 1 wherein each of said second modified regions includes a first coupling leg and a second coupling leg, wherein said first coupling leg is longer than said second coupling leg, and wherein said single seal-air conduit is formed when the coupling legs of the modified second region of each of said plurality of louvers engages the second coupling leg and the first coupling leg, respectively, of the second modified region of an adjacent one of said plurality of louvers.

3. The damper device as claimed in claim 1 wherein each of said first modified regions includes a first coupling leg and a second coupling leg of substantially equal length, and wherein said conduit-louver sealing chambers are formed when said first coupling leg and said second coupling leg of each of said first modified regions contact said louver interface means attached to said interior conduit walls.

4. The damper device as claimed in claim 3 wherein an upper louver of said plurality of louvers includes a modified upper louver region adjacent to a modified upper conduit region of an upper interior wall that is part of said louver interface means, said modified upper louver region having a first coupling leg and a second coupling leg, wherein said first coupling leg of said modified upper louver region is longer than said second coupling leg of said modified upper louver region, wherein said modified upper conduit region includes a first coupling leg and a second coupling leg, wherein said first coupling leg of said modified upper conduit region is longer than said second coupling leg of said modified upper conduit region, and wherein an upper-louver-conduit sealing chamber is formed when the first coupling leg of said modified upper louver region engages the second coupling leg of said modified upper conduit region and the second coupling leg of said modified upper louver region engages the first coupling leg of said modified upper conduit region.

5. The damper device as claimed in claim 4 wherein said louver interface means includes a flexible hub affixable to said interior wall of said conduit.

6. The damper device as claimed in claim 1 further comprising means for introducing purge air into said sealing chambers.

7. The damper device as claimed in claim 2 wherein said first coupling leg of each of said second modified regions includes sealing means for sealing engagement of said first coupling leg with said second coupling leg of the second modified region of an adjacent one of said plurality of louvers.

8. The louver damper device as claimed in claim 7 wherein said sealing means includes a leaf spring seal.

9. The louver damper device as claimed in claim 3 wherein said second coupling leg of each of said modified regions includes sealing means for sealing engagement of said second coupling leg with said first coupling leg of an adjacent one of said modified regions.

10. The louver damper device as claimed in claim 9 wherein said sealing means includes a leaf spring seal.

11. A louver damper device for controlling fluid flow in a conduit having an upper interior wall, a lower interior wall, and interior side walls, said louver damper device comprising:
   a. a unitary single-walled louver formed with an interior sealing conduit, a first modified perimeter region for interfacing with the upper interior wall of said conduit, and a second modified region for interfacing with the lower interior wall and the interior side walls;

b. louver interface means attachable to the interior upper, lower, and side walls of said conduit; and c. actuation means connected to said louver for pivoting said louver within said conduit, wherein said first modified region of said louver is designed to engage said louver interface means attached to the upper interior wall when said damper device is actuated into a closed position so as to form an upper sealing chamber, wherein said second modified region is designed to engage with said louver interface means attached to the lower interior wall and the interior side walls when said damper device is actuated into a closed position so as to form a lower sealing chamber and a pair of side sealing chambers, and wherein when said damper device is actuated into a closed position, said interior sealing conduit, said upper sealing chamber, said lower sealing chamber, and said pair of side sealing chambers are interconnected.

12. A louver damper device for controlling fluid flow in a conduit having interior walls, said louver damper device comprising:

a. a unitary single-walled louver formed with an interior sealing conduit and a modified perimeter region for interfacing with the interior walls of said conduit;

b. louver interface means attachable to said interior walls of said conduit; and c. actuation means connected to said louver for pivoting said louver within said conduit, wherein said modified perimeter of said louver is designed to engage said louver interface means when said damper device is actuated into a closed position so as to form a perimeter sealing chamber, and wherein when said damper device is actuated into a closed position, said interior sealing conduit and said perimeter chamber are interconnected.

13. A device for sealing an interface between a damper louver and an interior wall of a conduit used to transfer fluid, said device comprising:

a. a conduit interface component attachable to a perimeter of the damper louver, said conduit interface component including a first coupling leg and a second coupling leg of substantially equal length; and b. a flexible hub affixable to said interior wall of said conduit, wherein said first coupling leg, said second coupling leg, and said flexible hub are arranged such that when the louver is actuated into a blocking position, said first coupling leg first contacts said flexible hub and remains in contact with said flexible hub when said second coupling leg comes in contact with said flexible hub.

* * * * *